United States Patent
Zumberge et al.

(10) Patent No.: US 7,469,593 B2
(45) Date of Patent: Dec. 30, 2008

(54) PIEZO-ELECTRIC FORCE SENSOR AND METHOD

(75) Inventors: Jon T. Zumberge, Centerville, OH (US); Thomas A. Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 48 days.

(21) Appl. No.: 11/337,298

(22) Filed: Jan. 23, 2006

(65) Prior Publication Data

US 2007/0169560 A1    Jul. 26, 2007

(51) Int. Cl.
*G01B 7/16* (2006.01)
*G01L 1/00* (2006.01)

(52) U.S. Cl. .................................................. 73/777
(58) Field of Classification Search ............. 73/777, 73/862.49
See application file for complete search history.

(56) References Cited

U.S. PATENT DOCUMENTS

| | | | | |
|---|---|---|---|---|
| 5,054,323 | A | * | 10/1991 | Hubbard et al. ............... 73/754 |
| 5,527,194 | A | * | 6/1996 | Strong et al. .................. 440/80 |
| 5,677,488 | A | * | 10/1997 | Monahan et al. .............. 73/593 |
| 6,105,439 | A | * | 8/2000 | Roger ....................... 73/862.49 |
| 6,289,749 | B1 | * | 9/2001 | Sanders .................... 73/862.49 |
| 6,920,801 | B2 | * | 7/2005 | Van Leeuwen et al. ... 73/862.49 |
| 2006/0107765 | A1 | * | 5/2006 | Sentoku ................. 73/862.322 |

* cited by examiner

*Primary Examiner*—Edward Lefkowitz
*Assistant Examiner*—Octavia Davis
(74) *Attorney, Agent, or Firm*—Thomas N. Twoney

(57) ABSTRACT

A force sensor system including at least one portion of piezo-electric material and a thrust bearing having at least one roller associated therewith, the roller being adapted to move relative to the thrust bearing and contact the portion of piezo-electric material when the thrust bearing is subjected to an external force.

5 Claims, 2 Drawing Sheets

PIEZO-ELECTRIC FORCE SENSOR AND METHOD

The subject matter disclosed herein may have been created during the performance of a cooperative research and development agreement with the Department of the Air Force (Contract No. F33615-03-2308 P00002). Therefore, the government of the United States may have certain rights to the disclosed subject matter.

BACKGROUND

The present application relates to force sensors and, more particularly, to piezo-electric force sensors for electromechanical brake systems.

Electromechanical brake systems have been developed for use in the automotive, aerospace and aeronautical industries to control the speed, stability and operation of various vehicles and devices. Electromechanical brake systems may be used in combination with, or in place of, conventional hydraulic brake systems.

A typical electromechanical brake system may include an electric motor adapted to advance a piston into engagement with one or more brake pads and/or a rotor, thereby generating a braking force. The applied braking force may be controlled by controlling the rotational power supplied by the electric motor in response to measurements of the braking force.

Various techniques have been developed for estimating and/or measuring the braking force. For example, the braking force may be estimated by monitoring the displacement of the piston and converting the displacement into a force signal by modeling the electromechanical brake system as a spring and multiplying the piston displacement by a spring constant. Alternatively, the braking force may be measured directly using a force gauge.

Force gauges may include piezo-electric materials adapted to generate a voltage signal (or other electrical signal) when subjected to a mechanical force or strain. The voltage signal may be correlated into a force signal. However, piezo-electric materials do not output a constant voltage when subjected to a constant force and therefore may give rise to inaccurate measurements of force.

Accordingly, there is a need for an improved piezo-electric force sensor and, in particular, an improved piezo-electric force sensor for measuring the braking force generated by an electromechanical brake system.

SUMMARY

In one aspect, a force sensor system includes at least one portion of piezo-electric material and a thrust bearing having at least one roller associated therewith, the roller being adapted to move relative to the thrust bearing and contact the portion of piezo-electric material when the thrust bearing is subjected to an external force.

In another aspect, an electromechanical brake system includes an electric motor, a housing having a piston slidably disposed therein, a driving member adapted to operably connect the piston to the motor, wherein rotational power from the motor is converted into axial movement of the piston, a thrust bearing disposed over the driving member to restrict axial movement of the driving member relative to the housing beyond a predetermined point, the thrust bearing including at least one roller positioned between the thrust bearing and the housing to facilitate rotation of the thrust bearing relative to the housing, and at least one portion of piezo-electric material disposed between the thrust bearing and the housing, wherein the roller is adapted to contact and stop contacting the portion of piezo-electric material as the thrust bearing rotates relative to the housing, the roller applying a force to the portion of piezo-electric material when the roller is in contact with the portion of piezo electric material.

In another aspect, a method for determining a force measurement includes the steps of providing a thrust bearing having at least two rollers associated therewith, positioning at least two portions of piezo-electric material on the thrust bearing such that the portions of piezo-electric material are position between the thrust bearing and the rollers, moving the rollers relative to the thrust bearing such that the rollers contact and stop contacting the portions of piezo-electric material and monitoring signals generated by each of the portions of piezo-electric material when the rollers contact the portions or piezo-electric material.

Other aspects of the disclosed sensor systems and methods will become apparent from the following description, the accompanying drawings and the appended claims.

DETAILED DESCRIPTION

Figure 1:
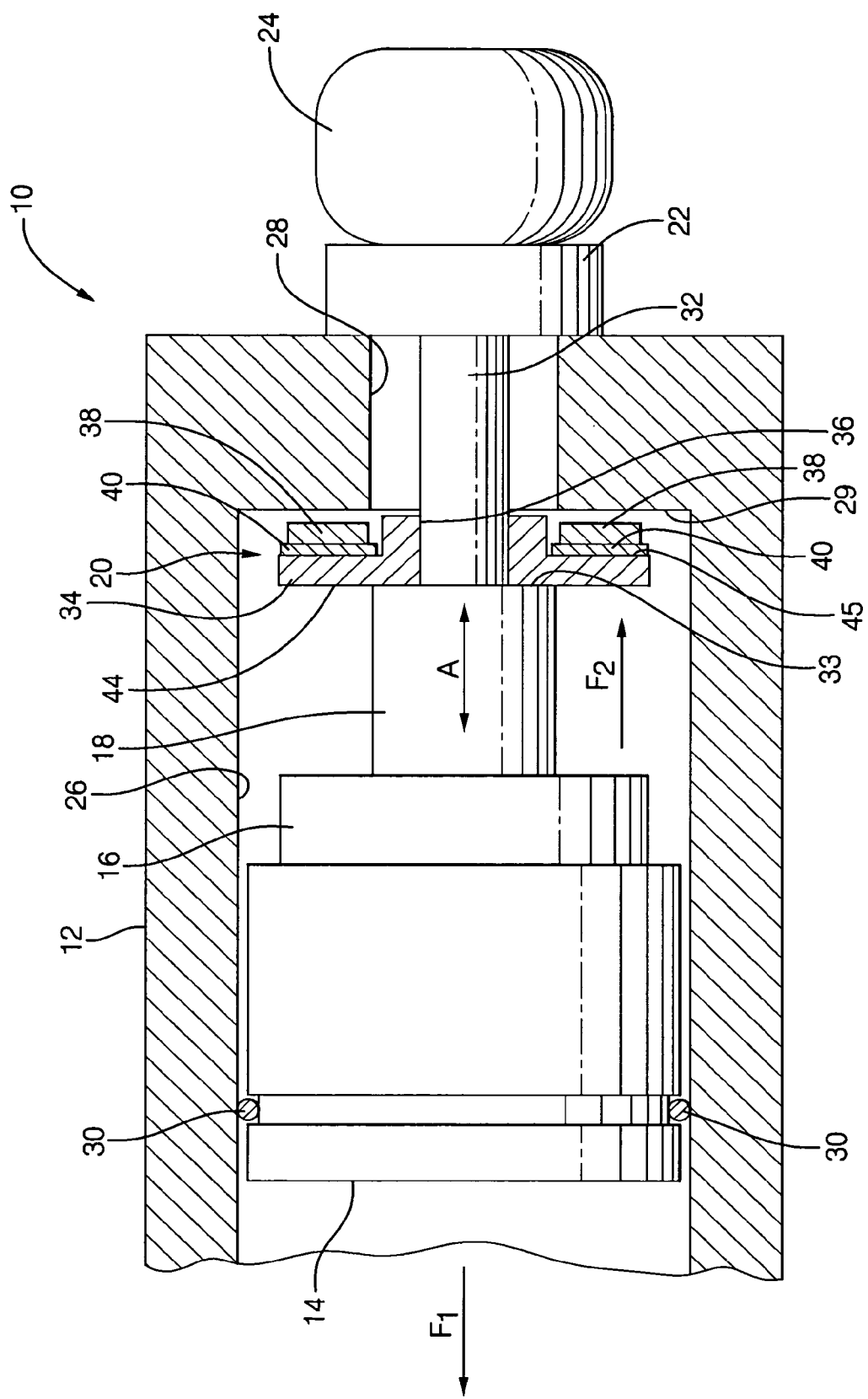
FIG. 1 is a side elevational view, in section, of an electromechanical brake system according to one aspect of the disclosure.

As shown in FIG. 1, one aspect of an electromechanical brake system, generally designated 10, may include a caliper housing 12, a piston 14, a screw member 16, a driving member 18, a thrust bearing 20, a transmission 22 and an electric motor 24. The motor 24 and transmission 22 preferably are attached to the housing 12. The housing 12 may define a central bore 26 therethrough and a smaller diameter axial passage 28. The transition from the central bore 26 to the passage 28 forms a bearing surface 29. The piston 14 may be closely and slidably received within the central bore 26. A gasket 30, such as an O-ring, may be provided to form a seal between the piston 14 and the bore 26. The brake system 10 may be installed in an automotive vehicle as part of a braking system, or may be part of the braking system of aircraft landing gear or of stationary machinery having large moving parts such as a turntable.

The driving member 18 may include a small diameter portion 32 shaped to extend through the axial passage 28 in the housing 12 to connect the transmission 22 and motor 24 to the screw member 16 and piston 14. The transition to the small diameter portion 32 may form a shoulder 33 on the driving member 18. Thus, output torque from the motor 24 may be transferred to the driving member 18 through the transmission 22, the rotation of the driving member 18 may be transferred to the screw member 16 and the rotation of the screw member 16 relative to the piston 14 may be converted into axial movement of the piston 14 within the bore 26. Thus, the motor 24 may be actuated to advance the piston 14 axially in the direction shown by arrow $F_1$, to engage an associated brake pad (not shown) to apply a braking force to a rotor (not shown), and to retract the piston 24 axially in the direction shown by arrow $F_2$ to release the braking force.

Those skilled in the art will appreciate that the piston 14 and screw member 16 may be part of a ball screw assembly or the like, although any system or apparatus adapted to convert rotational power from the motor 24 into relative axial movement of the piston 14 may be used.

Figure 2:
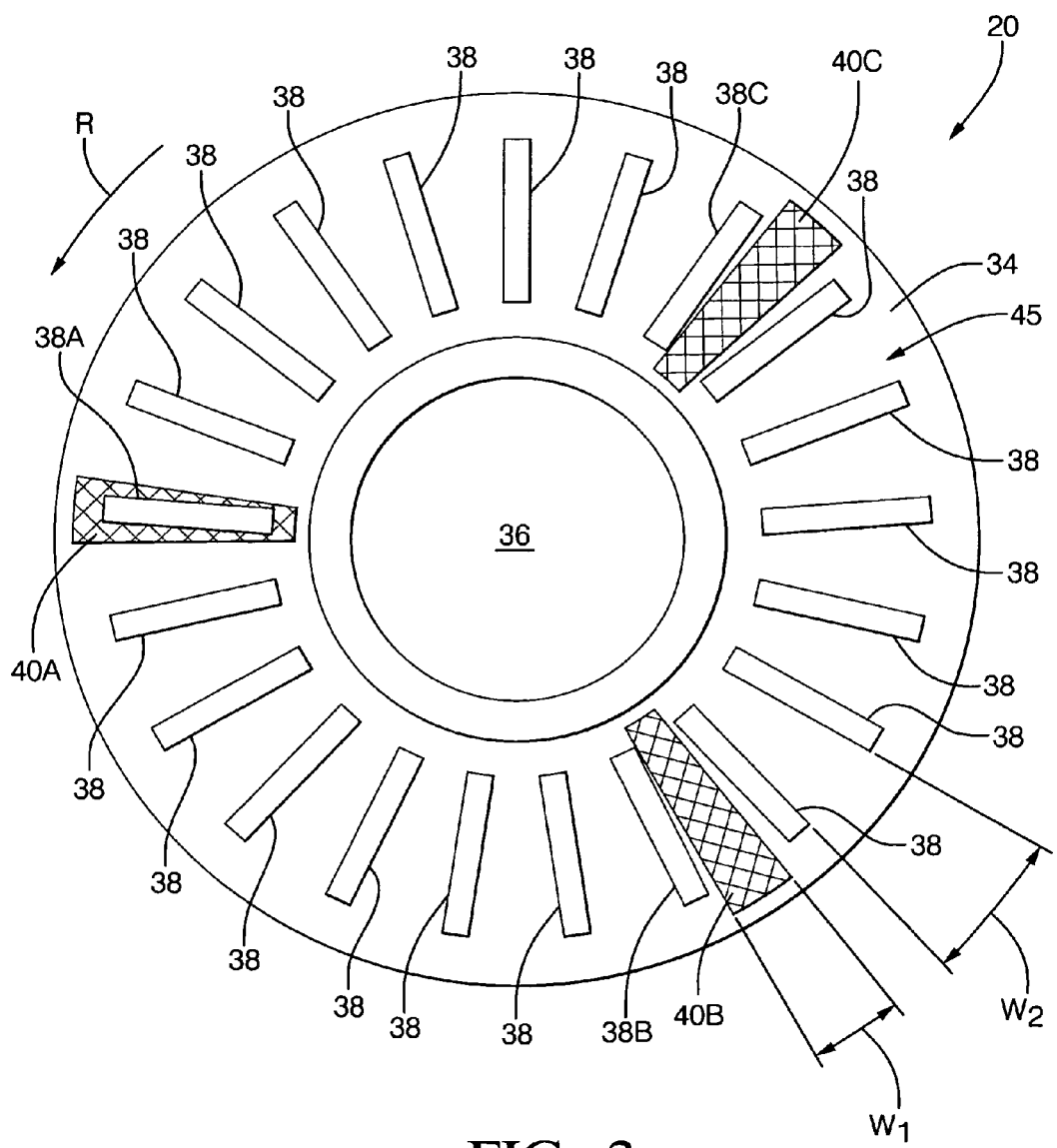
FIG. 2 is an end view of a thrust bearing of the system of FIG. 1.

As shown in FIGS. 1 and 2, the brake system 10 may include a thrust bearing 20 having a generally cylindrical washer portion 34, a plurality of generally radially extending rollers 38 and pads 40A, 40B, 40C. The rollers 38 may be needle rollers, ball bearings or the like. The washer portion 34 may include an outer surface 44, an inner surface 45 and a central bore 36 therethrough adapted to receive the small diameter portion 32 of the driving member 18 therein. The pads 40A, 40B, 40C may be spaced evenly on the inner surface 45 of the washer portion 34. The washer portion 34 may have a diameter (or other cross-sectional dimension) that is generally greater than the diameter of the axial passage 28 in the housing 12, thereby preventing the washer portion 34 from passing therethrough. The thrust bearing 20 thus may be captured between the shoulder 33 on the driving member 18 and the bearing surface 29 of the housing 12.

In one aspect, the pads 40A, 40B, 40C may be formed from or may include a piezo-electric material or the like and may be capable of generating an electric signal (e.g., a voltage) when subjected to a compressive force or strain. For example, the piezo-electric material may be a piezo-ceramic material such as PZT, PVDT or any other piezo-electric material. Each pad 40A, 40B, 40C may be in communication with a controller (not shown), a processor (not shown) or the like capable of receiving the electric signals generated by the pads 40A, 40B, 40C and/or correlating the electric signals into force measurements.

The washer portion 34 may be mounted on the driving member 18 such that the small diameter portion 32 of the driving member 18 extends through the central bore 36 of the washer portion 34 and the shoulder 33 seats against the outer surface 44 of the washer portion 34. The engagement of the washer portion 34 and bearing surface 29 prevents the driving member 18 from moving axially when the piston 14 is advanced in the direction shown by arrow $F_1$. Therefore, the thrust bearing 20 may act to resist the reactive force $F_2$ transmitted by the piston 14 to the driving member 18 while the piston is advanced axially by motor 24 to exert a braking force.

The rollers 38 may be aligned generally radially with respect to a central axis A of the washer portion 34 such that the washer portion 34 may rotate relative to the housing 12 as the driving member 18 rotates and exerts a reactive force $F_2$ on the thrust bearing 20. In one aspect, the thrust bearing 20 may include about 2 to about 100 rollers 38. In another aspect, the thrust bearing 20 may include about 36 rollers 38.

In one aspect, the pads 40A, 40B, 40C may be positioned between the washer portion 34 and the rollers 38, as shown in FIGS. 1 and 2, such that the rollers 38 exert a dynamic force onto the pads 40A, 40B, 40C as the rollers 38 move relative to the pads 40A, 40B, 40C (i.e., as the driving member 18 rotates, causing the thrust bearing 20 to rotate). Alternatively, the pads 40A, 40B, 40C may be positioned between the housing 12 and the rollers 38 (e.g., on the housing). Those skilled in the art will appreciate that the pads 40A, 40B, 40C may be positioned at any location that allows the rollers 38 to transfer the reactive force $F_2$ from the driving member 18 to the pads 40A, 40B, 40C, thereby generating a dynamic force as the rollers 38 move relative to the pads 40A, 40B, 40C.

Thus, the thrust bearing 20 may be adapted to resist reactive force $F_2$ when the piston 14 applies a braking force $F_1$, while allowing the driving member 18 to rotate relative to the housing 12. As the thrust bearing 20 resists reactive force $F_2$, which may correspond to the braking force $F_1$, the rollers 38 may be urged against the pads 40A, 40B, 40C of piezo-electric material and a dynamic (e.g., voltage) signal may be generated and monitored. The dynamic signal may be correlated into a braking f6rce measurement.

In one aspect, dynamic force signals may be obtained by utilizing multiple pads 40A, 40B, 40C and spacing the pads 40A, 40B, 40C relative to each other. As shown in FIG. 2, the system 10 may include three pads 40A, 40B, 40C spaced about 120 degrees apart. Alternatively, the system 10 may include six pads (not shown) spaced about 60 degrees apart. Those skilled in the art will appreciate that various numbers and arrangements of pads 40A, 40B, 40C and rollers 38 may be used to achieve the desired dynamic force signals.

In another aspect, the pads 40A, 40B, 40C may be sized, shaped and positioned such that one pad 40A may be centered on a roller 38A, while one pad 40B may be positioned to contact a roller 38B upon slight rotation of bearing 20 in the direction shown by arrow R, and one pad 40C may have just broken contact with roller 38C at some point as the thrust bearing 20 rotates in the direction shown by arrow R.

In anther aspect, each pad 40A, 40B, 40C may be generally evenly spaced and may have a pad width $W_1$ that is about ¼ to about ¾ the distance $W_2$ between adjacent rollers 38. For example, each pad 40A, 40B, 40C may be spaced about 120 degrees apart and may have a pad width $W_1$ that is about ⅔ the distance $W_2$ between adjacent rollers 38.

Accordingly, a dynamic force signal may be generated at each pad 40A, 40B, 40C as the rollers 38 contact and break contact with the pads. The force signals may be correlated with the electric (e.g., voltage) signals generated by the pads 40A, 40B, 40C pursuant to the piezo-electric effect. For example, when the system 10 includes three pads 40A, 40B, 40C, the three dynamic force signals generated therefrom may be averaged to provide a braking force measurement as the driving member 18 drives the piston 14.

Those skilled in the art will appreciate that, depending upon the number of pads 40A, 40B, 40C and rollers 38 included in the system 10, braking force measurements may be obtained even when the driving member 18 rotates relatively slowly to advance the piston 14.

Although various aspects of sensor systems and methods have been shown and described, modifications may occur to those skilled in the art upon reading the specification. Any patent that may issue on this application includes such modifications and is limited only by the scope of the claims.

What is claimed is:

1. A method for determining a force measurement comprising the steps of:
   providing a thrust bearing having a washer portion and at least two rollers moveable relative to said washer portion;
   positioning at least two portions of piezo-electric material on said thrust bearing such that said portions of piezo-electric material are positioned between said washer portion and said rollers;
   moving said rollers relative to said washer portion such that said rollers contact and stop contacting said portions of piezo-electric material; and
   monitoring signals generated by each of said portions of piezo-electric material when said rollers contact said portions of piezo-electric material.

2. The method of claim 1 further comprising correlating said signals generated by each of said portions of piezo-electric material into force signals.

3. The method of claim 1 further comprising averaging said signals generated by each of said portions of piezo-electric material to obtain an average signal.

4. The method of claim 3 further comprising applying an external force to said thrust bearing, wherein said average signal is indicative of said external force.

5. The method of claim 1 wherein a first one of said rollers is in contact with a first one of said portions of piezo-electric material when a second one of said rollers is not in contact with a second one of said portions of piezo-electric material, and wherein said second one of said rollers is in contact with said second one of said portions of piezo-electric material when said first one of said rollers is not in contact with said first one of said portions of piezo-electric material. of said external force.

* * * * *